(12) United States Patent  
Rahman et al.

(10) Patent No.: US 7,885,032 B1  
(45) Date of Patent: Feb. 8, 2011

(54) APPARATUS AND METHOD FOR BULK ERASURE OF DISK DRIVES

(75) Inventors: Babu S. Rahman, Fremont, CA (US); Erhard Schreck, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 420 days.

(21) Appl. No.: 11/428,696

(22) Filed: Jul. 5, 2006

Related U.S. Application Data

(60) Provisional application No. 60/779,553, filed on Mar. 6, 2006.

(51) Int. Cl.
*G11B 5/03* (2006.01)

(52) U.S. Cl. .............................. 360/66; 360/59; 360/60; 360/62; 361/134

(58) Field of Classification Search .................. None
See application file for complete search history.

(56) References Cited

U.S. PATENT DOCUMENTS

| | | | |
|---|---|---|---|
| 4,404,674 A | | 9/1983 | Rhodes |
| 4,742,404 A | * | 5/1988 | Yunoki .................. 360/66 |
| 5,132,860 A | * | 7/1992 | Von Stein ................ 360/118 |
| 5,243,580 A | * | 9/1993 | Maeda .................. 369/13.2 |
| 5,589,262 A | * | 12/1996 | Kiuchi et al. ............. 428/336 |
| 5,621,583 A | * | 4/1997 | Parks et al. ............... 360/81 |
| 5,635,889 A | | 6/1997 | Stelter .................... 335/306 |
| 5,652,739 A | * | 7/1997 | Matsumoto et al. ...... 369/13.36 |
| 5,864,654 A | | 1/1999 | Marchant |
| 5,900,728 A | * | 5/1999 | Moser et al. ............. 324/244 |
| 5,979,774 A | * | 11/1999 | Urushibata ............... 235/493 |
| 6,038,679 A | | 3/2000 | Hanson |
| 6,249,200 B1 | | 6/2001 | Stelter et al. ............. 335/302 |
| 6,462,907 B1 | * | 10/2002 | Masuzawa et al. .......... 360/133 |
| 6,519,740 B1 | | 2/2003 | Martensson et al. |
| 6,570,727 B1 | * | 5/2003 | Tamura et al. ............. 360/66 |
| 6,714,398 B2 | * | 3/2004 | Schultz .................. 361/134 |
| 6,744,583 B2 | * | 6/2004 | Ikeda et al. .............. 360/59 |
| 6,906,880 B1 | * | 6/2005 | Codilian ................. 360/66 |
| 6,954,317 B2 | * | 10/2005 | Aoki et al. ............... 360/17 |
| 7,079,345 B1 | * | 7/2006 | Nguy et al. ............... 360/66 |
| 7,149,045 B1 | * | 12/2006 | Mallary et al. ............ 360/55 |

(Continued)

OTHER PUBLICATIONS

U.S. Appl. No. 60/779,553, filed Mar. 6, 2006, entitled Bulk Eraser for Disk Drives, by Rahman et al.

*Primary Examiner*—Dismery E Mercedes

(57) ABSTRACT

The present invention is directed to a method and apparatus for bulk erasure of disk drives. According to the novel invention, one or more relatively small-sized permanent magnets or electromagnets are configured to be brought into close proximity to a particular disk surface of the disk drive and to produce a concentrated magnetic force that erases the disk. Notably, the magnets are sized and configured to create a focused magnetic field, and correspondingly to prevent stray magnetic fields, which could otherwise be harmful to magnetically sensitive components of the disk drive, such as motor magnets. The magnets may be configured to gain access to the disk surface through one or more openings on a covered disk drive, e.g., through an actuator and/or servo track writer opening. The magnets and resultant focused magnetic field may be large enough to offer substantially full radial coverage of the disk, or may be smaller and configured to move (e.g., "sweep") across the surface of the disk for full coverage accordingly.

38 Claims, 7 Drawing Sheets

U.S. PATENT DOCUMENTS

| | | | |
|---|---|---|---|
| 7,164,569 B1* | 1/2007 | Thiel et al. | 361/149 |
| 7,549,210 B2* | 6/2009 | Teo et al. | 29/603.03 |
| 7,646,579 B2* | 1/2010 | Kitamura et al. | 361/149 |
| 2001/0043420 A1* | 11/2001 | Serizawa | 360/57 |
| 2002/0021521 A1* | 2/2002 | Kitahori et al. | 360/66 |
| 2002/0171982 A1* | 11/2002 | Lairson et al. | 360/319 |
| 2003/0043528 A1* | 3/2003 | Schultz | 361/143 |
| 2003/0196159 A1 | 10/2003 | Kondo et al. | |
| 2004/0051989 A1* | 3/2004 | Hasegawa et al. | 360/66 |
| 2005/0073766 A1* | 4/2005 | Price et al. | 360/66 |
| 2005/0219732 A1* | 10/2005 | Ito | 360/66 |
| 2006/0028747 A1* | 2/2006 | Arai et al. | 360/25 |
| 2007/0047128 A1* | 3/2007 | Kadowaki et al. | 360/66 |

* cited by examiner

CROSS-SECTION

APPARATUS AND METHOD FOR BULK ERASURE OF DISK DRIVES

CROSS-REFERENCE TO RELATED APPLICATION

The present application claims the benefit of U.S. Provisional Patent Application Ser. No. 60/779,553, which was filed on Mar. 6, 2006, by Rahman et al. for a BULK ERASER FOR DISK DRIVES, which provisional application is hereby incorporated by reference as though fully set forth herein.

BACKGROUND OF THE INVENTION

1. Field of the Invention

This invention relates generally to demagnetizing magnetic recording media, and, more specifically, to an apparatus and method for bulk erasure of disk drives.

2. Background Information

It is often desirable to imprint a magnetic pattern onto a medium (e.g., a disk, a tape, a credit card, etc.) in a predictable and reproducible manner. One approach to imprinting a magnetic pattern onto a medium is servo media printing. In particular, a conventional magnetic recording disk typically contains servo patterns written in preselected regions ("servo sectors") on the disk surface. The servo patterns provide position and tracking information during a readout process. For instance, each servo pattern may store information that enables a read head to determine its relative position on the disk surface. In addition, the servo pattern also may be configured to cause the read head to generate a position error signal when it reads the servo pattern. The position error signal is then fed back to a controller that controls the head's tracking.

The servo patterns are typically written on the magnetic recording disk during a disk-manufacturing process, e.g., in a clean room environment. There are various known techniques for writing the servo patterns on the disk. One common technique is to program a magnetic write head to write the servo patterns as the disk rotates beneath the head. For instance, some disk drives are capable of self-servo writing, such as, e.g., by "spiral writing" the servo pattern on the disks, as will be understood by those skilled in the art.

Another known technique for writing servo patterns utilizes magnetic printing. A printing master is constructed having a plurality of ferromagnetic "teeth" that are constructed and arranged to coincide with at least one servo pattern. The teeth may be used either to shield their contacted disk surfaces from the applied writing field (e.g., longitudinal recording), or alternatively to concentrate magnetic flux at their contacted surfaces (e.g., perpendicular recording). In either case, a copy of the teeth pattern is written onto the disk and the printing master is removed.

Yet another known technique for writing servo patterns employs laser light to transfer the patterns to disk using heat assisted magnetic recording (HAMR). Incident light is focused at selected areas on the disk surface to produce a pattern of heated areas corresponding to the servo patterns, and an external magnetic field is applied to the heated areas to copy the servo patterns to the disk.

For many (if not all) of these servo writing techniques to work properly, the disk should be substantially free of magnetic signals (i.e., a "clean" disk). For instance, during manufacture, a recording layer often develops various magnetized regions that may cause magnetic interference during servo-write operations. These magnetic regions may result in track profile asymmetries. For recording systems that use signals from prewritten tracks or sector servos to position the read head, such asymmetries can result in positioning errors. In particular, when first servo writing a disk surface, these magnetic regions, with generally unknown locations, may adversely effect the precision with which the servo tracks are written (e.g., especially for self-servo writing drives). Therefore, "preconditioning" the media (e.g., disk) to reduce the large magnetized regions becomes very important. Also, during various stages of manufacturing the disk drives, the disks may need to be "reworked" (preconditioned again, or re-initialized, etc.).

"Bulk erasing" may be used to erase any undesired (and unknown) magnetic regions, or domain walls, on the disk surfaces, such as pre-magnetizing the disk in a uniform direction. One method used to bulk erase a disk is a direct current (DC) erase method using a write head of the disk drive. In particular, the write head passes over the entire disk (i.e., every track of the disk) and directs the magnetizations in a single direction to erase the disk. Those skilled in the art, however, will understand that because write heads are generally small in size and designed to write a single track at a time, this method is time consuming, as it requires the write head to pass over every track of the disk (e.g., 40 minutes).

Alternatively, a faster method to bulk erase a disk utilizes an "open loop" external magnetic field across the entire disk surface (i.e., from outside diameter (OD) to inside diameter (ID)). For instance, two large permanent magnets may be spaced a certain distance from one another in order to create a large DC magnetic field between them. The entire disk drive (e.g., within a cover or removed from the cover) is then inserted into the DC field to erase the disks contained therein. One problem associated with using large permanent magnets in this manner is that the erasure may not be precise, and may cause stray magnetic fields to reach components of the disk drive other than the disks themselves. Particularly, these stray, and often very strong magnetic fields, may cause damage to sensitive components, such as partially demagnetizing motor magnets of the drive. For example, typical motor magnets may be demagnetized with a field greater than 2 kilo Gauss (kG). However, to erase a disk, approximately 5 kG must reach the surface of the disk, so stray fields of 2 kG or more (e.g., up to the erasing field, 5 kG) may also inadvertently reach the motor magnets, thus causing damage. Further, another problem associated with using permanent magnets in this manner is that they are often big and bulky designs, and having large permanent magnets in a manufacturing clean room, even with adequate shielding (also big and bulky), may cause undesirable magnetic contamination to other devices in the room.

There remains a need, therefore, for a system that efficiently (e.g., quickly and completely) bulk erases the surface of a disk in a disk drive, without causing potential harm to sensitive components of the disk drive. Further, there remains a need for such a system that may apply DC and alternating current (AC) erasing to be effectively operational for both longitudinal recording media and perpendicular recording media.

SUMMARY OF THE INVENTION

The present invention is directed to an apparatus and method for bulk erasure of disk drives. According to the novel invention, one or more relatively small-sized permanent magnets or electromagnets are configured to be brought into close proximity to a particular disk surface of the disk drive and to produce a concentrated magnetic force. For instance, the magnet may be configured to gain access to the disk surface through one or more openings on a covered disk drive, e.g., through an actuator and/or servo track writer opening. Alternatively, disk drives, with or without openings, may be uncovered to provide access to the disk surface. The concentrated magnetic force produced by the magnet may then be applied to the disk surface to erase the disk, such as by spinning the disk beneath the magnet a sufficient number of revolutions to fully erase at least the particular disk surface. Notably, the magnets are sized and configured to create a focused magnetic field, and correspondingly to prevent stray magnetic fields, which could otherwise be harmful to magnetically sensitive components of the disk drive, such as motor magnets. The magnet and/or the resultant focused magnetic field may be large enough to offer substantially full radial coverage of the disk, or may be smaller and configured to move (e.g., "sweep") across the surface of the disk for full coverage accordingly.

Advantageously, the novel invention bulk erases disk drives bringing concentrated magnetic force mechanisms (and resultant focused magnetic fields) close to the disk surface to be erased. The magnets of the novel invention limit stray magnetic fields, thus preventing potentially harmful effects on other components of the disk drives. Also, the present invention may be used with both AC- and DC-demagnetization, and is thus applicable to both perpendicular and longitudinal magnetic recording disk drives. Further, the present invention is efficient and relatively simple to implement, conserving time, space, and expenses.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN
ILLUSTRATIVE EMBODIMENT

Figure 1:
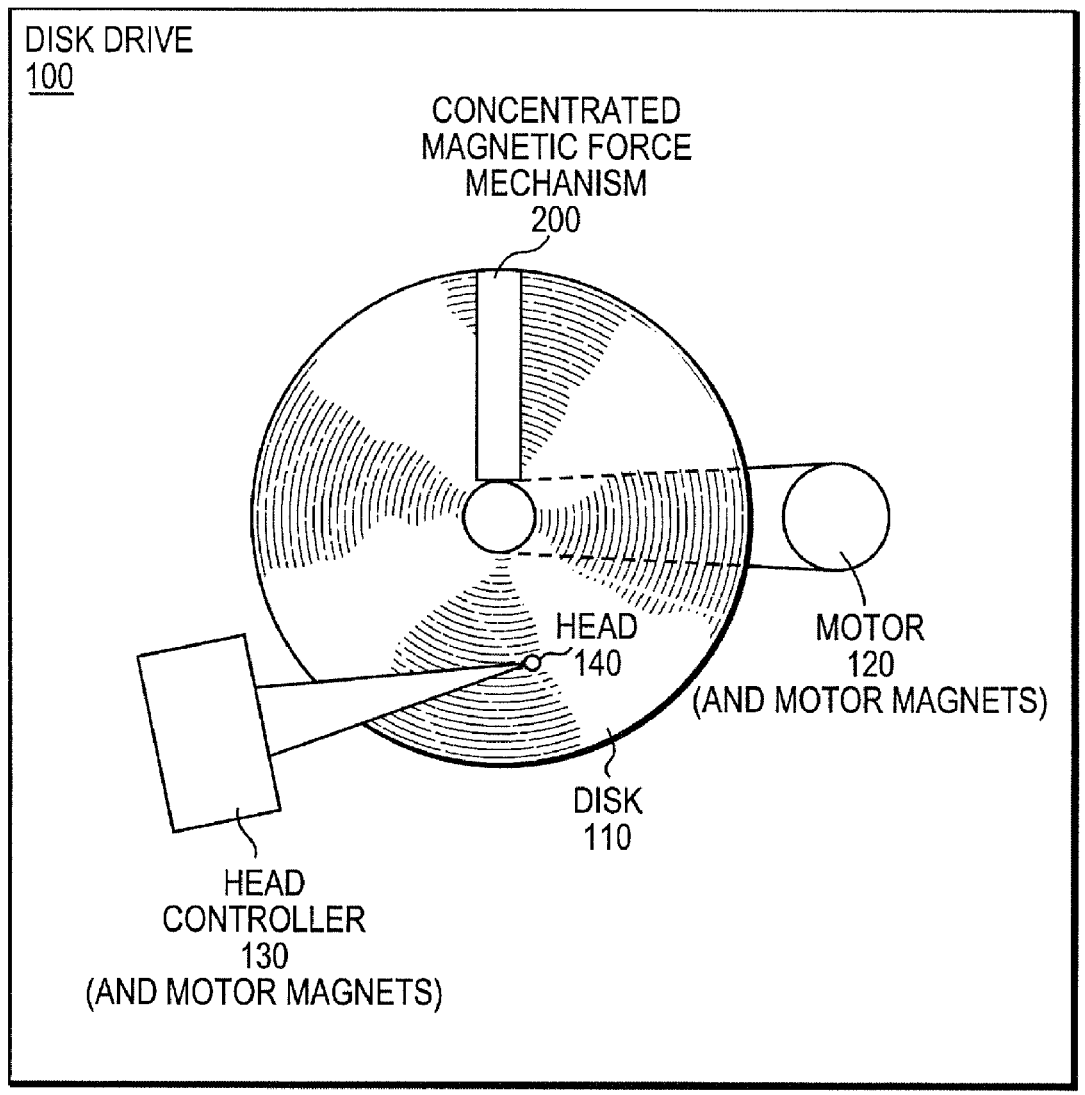
FIG. 1 illustrates an exemplary disk drive comprising a magnetic recording medium, such as a magnetic disk, that advantageously may be used in accordance with the illustrative embodiments.

FIG. 1 illustrates an exemplary disk drive 100 that comprises a magnetic recording medium, such as a magnetic disk 110, that advantageously may be used in accordance with the illustrative embodiments. The disk 110 may comprise, for example, a magnetic recording layer deposited on a substrate, as will be understood by those skilled in the art. The disk also may contain other magnetic or non-magnetic layers, such as a soft magnetic underlayer, exchange-coupled layer, lubrication layer, carbon overcoat, etc., which are not explicitly shown. The recording layer may be fabricated using various ferromagnetic materials and alloys, e.g., embodied as thin-film or particulate media, and may be deposited on the substrate using a variety of deposition techniques known in the art. The substrate also may be constructed from various materials, such as glass or conventional aluminum-magnesium substrates used for magnetic disks. The disk drive 100 may also comprise a motor 120 used to spin the disk 110, as well as a head controller 130 to control a read-write head 140, as will be understood by those skilled in the art. Particularly, the motor 120 and/or controller 130 may each have one or more motor magnets (e.g., permanent magnets), as will also be understood by those skilled in the art.

The present invention is directed to an apparatus and method for bulk erasure of disk drives. According to the novel invention, a concentrated magnetic force mechanism 200 is configured to produce a concentrated magnetic force that is brought in close proximity to a particular disk surface 110 of the disk drive 100. In accordance with the present invention, the concentrated magnetic force mechanism 200 may be embodied as one or more magnets, each of which may be a relatively small-sized permanent magnet or an electromagnet. Both types of magnets may be used to create a direct current (DC) magnetic field for DC erasure of the disk 110, as will be understood by those skilled in the art. Also, an electromagnet may be used to create an alternating current (AC) magnetic field (e.g., with a control mechanism, not shown), such as for AC erasure of the disk (e.g., described below).

Figure 2:
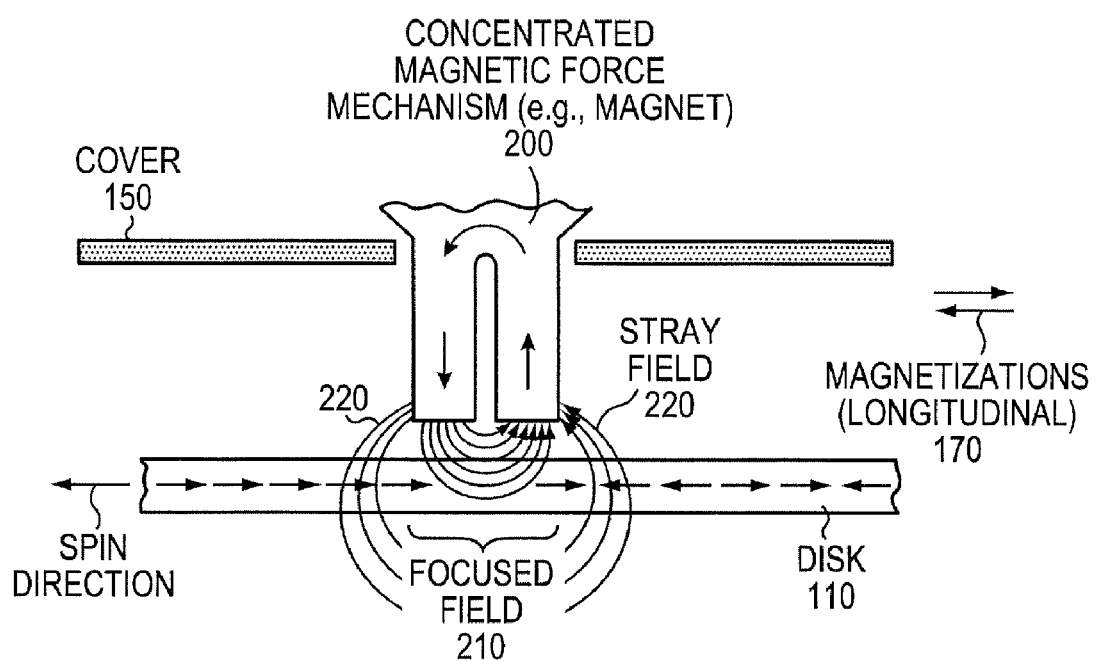
FIG. 2 is simplified schematic cross-sectional diagram of an illustrative concentrated magnetic force mechanism for use with bulk-erasing a longitudinal recorded disk in accordance with the present invention.
Figure 3:
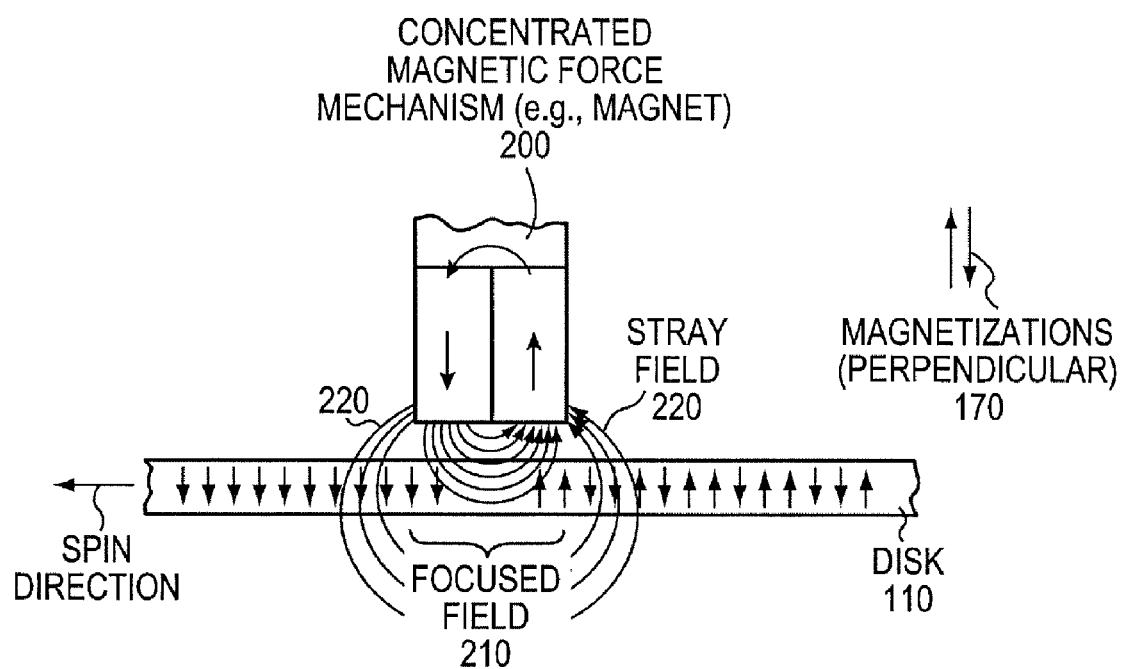
FIG. 3 is simplified schematic cross-sectional diagram of an illustrative concentrated magnetic force mechanism for use with bulk-erasing a perpendicular recorded disk in accordance with the present invention.

FIGS. 2 and 3 are simplified schematic cross-sectional diagrams of illustrative concentrated magnetic force mechanisms 200 for use with bulk-erasing a disk 110 in accordance with the present invention. Notably, information can be stored on the disk 110, more specifically, in the magnetic recording layer, by selectively aligning the layer's magnetizations 170 in different directions (e.g., along an anisotropy axis). Although the exemplary recording layer in FIG. 2 is shown containing longitudinally oriented magnetizations, it is expressly contemplated that the recording layer alternatively may have a perpendicular anisotropy, e.g., as shown in FIG. 3.

The concentrated magnetic force mechanism 200 is configured to create a focused magnetic field 210, and to correspondingly prevent stray magnetic fields 220, which could otherwise be harmful to magnetically sensitive components of the disk drive 100, such as the motor magnets (not shown) of motor 120 and/or controller 130 of FIG. 1, as discussed above. In particular, the concentrated magnetic force mechanism 200 is configured to provide a sufficient focused magnetic field 210 to erase the magnetizations 170 of the disk 110, and to limit a stray magnetic field 220, to avoid damaging sensitive components. For example, in FIG. 2, two opposing magnetic poles (e.g., permanent magnets or electromagnets) may be placed adjacent one another (e.g., with an optional gap as shown) to create a focused magnetic field 210 shown. Permanent magnets 200, in particular, may be topped by a piece of ferromagnetic material (e.g., steel) to create a return path for magnetic flux of the focused field 210. Those skilled in the art will understand that while the fields 210 and 220 are shown in two-dimensional representation, focused fields 210 and stray fields 220 may also project three-dimensionally from mechanism 200. In particular, the fields may be projected parallel to the disk surface 110 (i.e., extending from lateral ends of the mechanism 200), possibly in the direction of other sensitive components of the disk drive 100.

Illustratively, an example focused field 210 produced by mechanism 200 may have between 4 kilo Gauss (kG) and 6 kG of magnetic force (flux density, B) at the disk surface 110 to erase the disk, e.g., 5 kG at the surface. Also, stray fields 220 (i.e., fields reaching sensitive components) should have no greater than 3 kG at the component, e.g., preferably no greater than 2 kG, before possible damage may occur to the components (e.g., partial demagnetization of motor magnets). Because of the above two constraints, the associated field gradient must be high, such that the field 210 remains a strong yet focused field, while stray fields 220 are minimal and substantially harmless to sensitive components. Since the field 210 drops off (dissipates) quickly, the concentrated magnetic force mechanism 200 may be brought into close proximity to the disk surface 110 to localize the affect of the focused field 210 to the disk. For example, the mechanism 200 may be brought to within 0.1 and 0.5 mm of the disk surface 110, e.g., 0.3 mm. Those skilled in the art will understand various techniques to formulate permanent and/or magnetic magnets having the desired properties/characteristics described in accordance with the present invention.

By bringing the concentrated magnetic force mechanism 200 into close proximity to the disk surface 110, the concentrated magnetic force (i.e., focused field 210) may then be applied to erase the disk. For instance, in FIG. 2 (longitudinal recorded media) and FIG. 3 (perpendicular recorded media) the disk 110 is spun in a direction as shown. By spinning the disk 110 beneath the mechanism (magnet) 200 a sufficient number of revolutions (e.g., one or more, described below), at least the particular disk surface 110 may be fully erased by the focused magnetic "erasure" field 210. Specifically, the applied field 210 saturates the recording layer in an initialization direction (e.g., before a magnetic pattern, such as a servo pattern, may be written thereon, as described above). As a result, the disk 110 is essentially uniformly magnetized (DC-erased) in the initialization direction. As shown in FIGS. 2 and 3, the illustrative magnetic fields 210 substantially aligns the magnetizations 170 in a single direction (e.g., "right" or "down"). Notably, while a single "track" is shown as being erased in cross-section, those skilled in the art will understand that the concentrated magnetic force mechanism 200 may be sized to erase more than one track at a time, as described below.

As described herein, the focused magnetic field 210 is sufficient to erase at least a single disk 110, such as an exposed and accessible disk, e.g., an "outermost" (or "top") disk of a plurality of disks, as described below. For example, certain disk drives 100 may only comprise a single disk 110 as shown. In addition, various servo track writers may some day require only a single "clean" disk 110 to perform servo track writing on a plurality of stacked disk surfaces 110 within a disk drive 100. Alternatively, however, the magnets 200 may produce a focused field 210 that is sufficient and directed to substantially erase a plurality of stacked disk surfaces 110 within the disk drive 100, provided that the stray fields 220 are sufficiently contained or bounded to be substantially harmless to magnetically sensitive components of the disk drive 100. The examples provided herein with reference to a single disk 110, therefore, are merely representative.

Notably, the present invention may also be utilized for both longitudinally recorded media and perpendicularly recorded media using AC or DC erasure, as appropriate, as will be understood by those skilled in the art. For instance, a high-frequency magnetization pattern that simulates an AC-erased state may be created (e.g., using an electromagnet as mechanism 200) to bulk erase a perpendicularly recorded media as in FIG. 3 (i.e., the additive effect of the stray magnetic fields generated by the high-frequency pattern essentially cancel one another to reduce the overall background noise, as will be understood by those skilled in the art).

As will be understood by those skilled in the art, one particular advantage of the present invention is that minimal eddy currents are created through the use of the concentrated magnetic force (e.g., for aluminum disk substrates). Accordingly, the present invention may allow for rapid revolutions of the disk 110, thus reducing time required to bulk erase the disk. For instance, the disk 110 may be brought up to speed (spun) prior to applying the concentrated magnetic force to erase the disk. In this way, the concentrated magnetic force need only be in close proximity to the disk surface 110 for a short period of time, thus further reducing stray field exposure to sensitive components.

Figure 4:
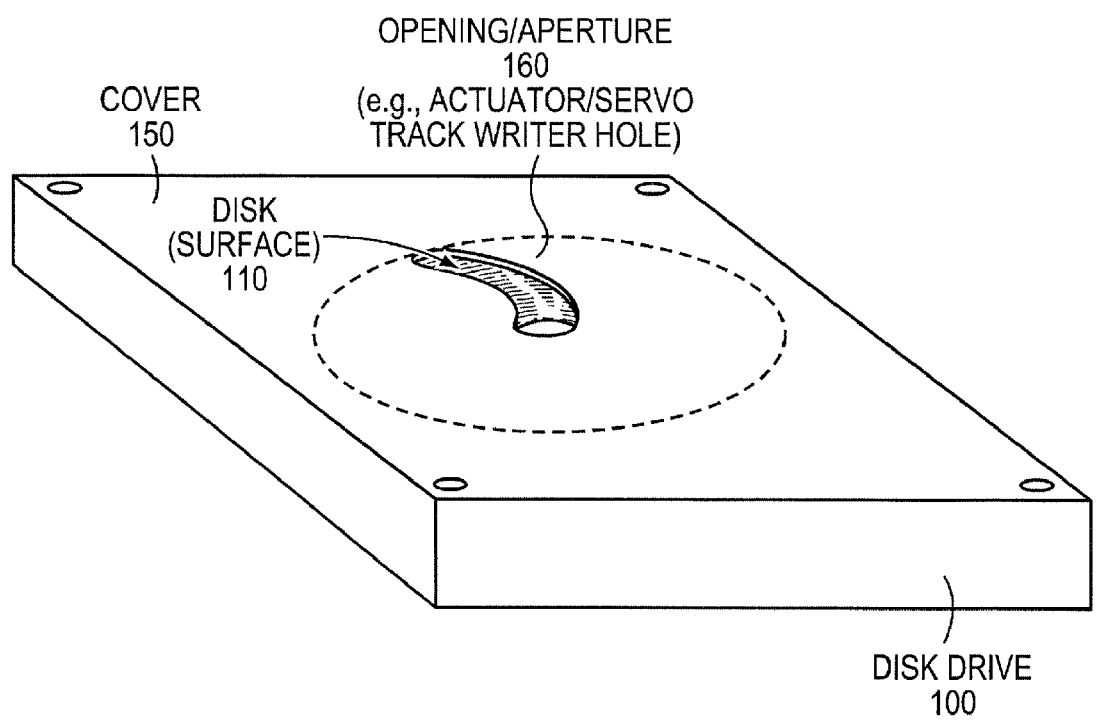
FIG. 4 is a simplified schematic diagram of the exterior of an exemplary disk drive that may be advantageously used with the present invention.

In accordance with the present invention, the concentrated magnetic force mechanism (magnet) 200 may be configured to gain access to the disk surface 110 through one or more openings on a covered disk drive 100. For instance, FIG. 4 is a simplified schematic diagram of the exterior of an exemplary disk drive 100 that may be advantageously used with the present invention. Illustratively, the cover 150 may include an actuator and/or servo track writer opening 160, which provides access to disk 110, e.g., for servo track writing, as will be understood by those skilled in the art. (Notably, due to the curved shape of opening 160 as shown, those skilled in the art often refer to opening 160 as a "banana hole.")

Figures 2, 5:
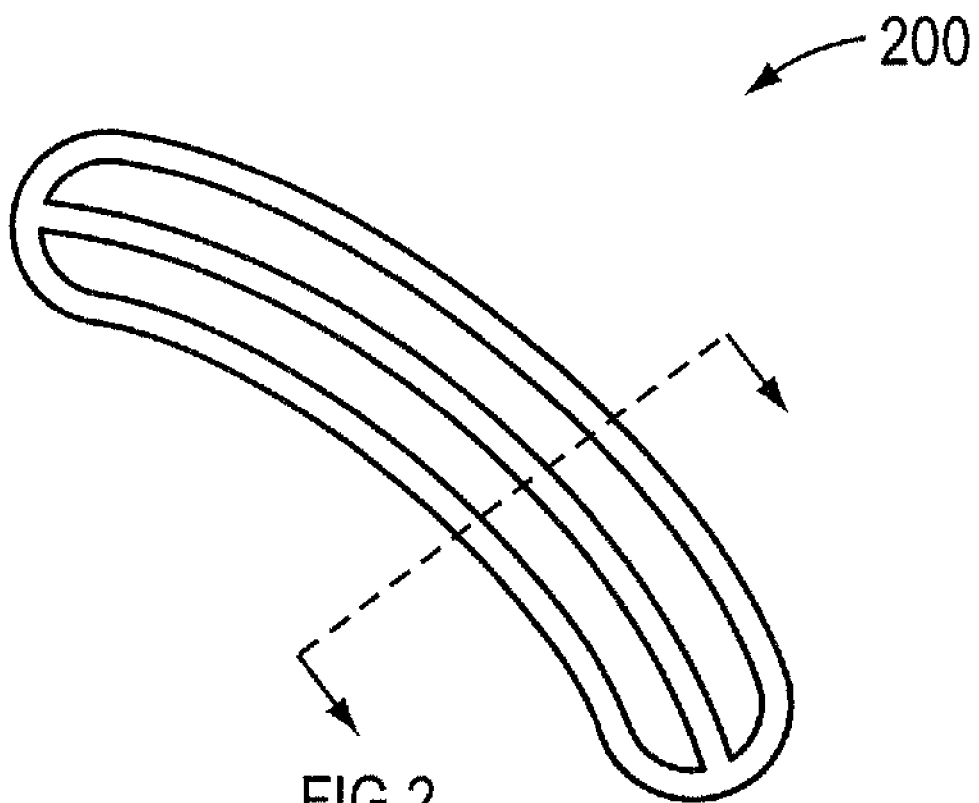
FIG. 5 is a simplified schematic block diagram of a concentrated magnetic force mechanism configured to fit through the opening shown in FIG. 4 in accordance with the present invention.

Accordingly, FIG. 5 is a simplified schematic block diagram of a concentrated magnetic force mechanism 200 configured to fit through the opening 160 shown in FIG. 4 above. For example, the curved opening may have a set of maximum dimensions (e.g., 2.5 mm wide, 7 mm long, etc.), for which the mechanism 200 must adhere in order to fit through the opening 160 (e.g., less than or equal to 2.5 mm wide, 7 mm long, etc.). Also, the cover 150 of the disk drive 100 may be placed a certain distance away from the disk surface 110. As such, the mechanism 200 may also be configured to achieve a depth through the opening 160 to reach the desired distance from the disk surface 110 (e.g., 0.3 mm). For instance, an illustrative cover 150 may be 1.5 mm from the disk surface 110, thus, the mechanism 200 may be designed to fit through the opening 160 for at least 1.2 mm. (Notably, a mechanism 200 configured for bulk erasure and to fit through an opening or "slit," may be referred to as a "slit eraser.")

Particularly, one advantage to shaping the concentrated magnetic force mechanism (magnet) 200 to fit within the opening 160 is that the cover 150 of the disk drive 100 need not be removed. (For example, FIG. 2 above demonstrates a side-view of a mechanism 200 through an opening in the cover 150, accordingly.) Illustratively, in accordance with the present invention, the slit eraser configuration for the magnetic force mechanism 200 may be retrofitted to servo-writers currently available (i.e., using similar control features), or may be a separate component of a new design implementation (e.g., specifically designed for application of magnetic force 210).

Notably, while the opening/aperture 160 shown has a particular shape (i.e., the "banana hole" of FIGS. 4 and 5), other apertures (not shown) with other shapes may be used in accordance with the present invention. For example, other shaped openings (e.g., rectangular openings) may be used within a disk drive cover 150, and the concentrated magnetic force mechanism 200 may be shaped to substantially conform to the other openings (e.g., a rectangular mechanism, such as shown in FIG. 1 above). Further, rather than configuring the concentrated magnetic force mechanism 200 to fit within a pre-designed opening 160 (e.g., for actuators, servo track writers, etc.), a dedicated opening may be designed for the mechanism. The shapes and relative sizes shown herein are merely representative examples, and those skilled in the art will understand that other shapes and relative sizes may be used in accordance with the present invention (i.e., provided that the desired magnetic properties of mechanism 200 are achieved, as described herein).

Alternatively, disk drives 100, with or without openings 160, may be uncovered to provide access to the disk surface. In particular, some disk drives 100 may be designed without the need for openings that provide full access to a disk surface 110. For example, certain disk drives may have the ability to self-servo write, and thus would not need an aperture 160 designed to allow an external servo track writer to access a disk surface. It may be necessary, then, to remove the cover 150 in order to provide access to the disk surface 110 (for example, FIG. 3 shows a coverless implementation). In accordance with the present invention, an aptly designed concentrated magnetic force mechanism 200 may still be used to provide the desired magnetic properties without a cover 150, and thus without the limitation of being required to fit through an external aperture 160 as in FIGS. 2 and 5.

In addition, e.g., for instances where the cover 150 does not have any appropriate openings as described above, the concentrated magnetic force mechanism 200 may be an internal component of the disk drive 100. While a permanent magnet placed inside a disk drive may be detrimental to magnetic performance (as will be understood by those skilled in the art), an electromagnetic configuration may be advantageously used as needed in accordance with the present invention. For instance, when needed for bulk erasure/preconditioning, the electromagnet 200 may be activated to provide the desired magnetic force as described herein. On the other hand, when not needed, the electromagnet may be deactivated, and remain substantially non-magnetic within the disk drive 100, allowing for safe operation of the disk drive. Notably, to prevent accidental bulk erasure of the disk drive, the internal concentrated magnetic force mechanism 200 may be configured to allow only manufacturer access. At the same time, however, it may be beneficial to allow bulk erasure access to consumers, such that the user of the disk drive 100 may bulk erase all data and information stored on the disk surface 110, such as in the event of a security emergency (e.g., potentially compromising secret/personal information, etc.).

In accordance with the present invention, the concentrated magnetic force mechanism (magnet) 200 and resultant focused magnetic field 210 may be large enough to offer substantially full radial coverage of the usable portion of disk surface 110 (e.g., from inner diameter (ID) to outer diameter (OD)). For instance, because the aperture 160 is generally configured to provide access to the entire usable portion of the disk surface 110 (e.g., for servo track writing), configuring a magnetic force mechanism 200 to conform to the size of the aperture 160 may apply a focused magnetic field 210 to the entire surface. In this case, a single revolution of the disk 110 may be all that is necessary to fully bulk erase the surface of the disk. For instance, in FIG. 1, the concentrated magnetic force mechanism 200 is substantially sized to provide full radial coverage of disk surface 110. Also, in FIG. 4 (and FIG. 5), the aperture 160 (and conforming magnet 200) are substantially sized to provide full coverage as well.

Figure 6:
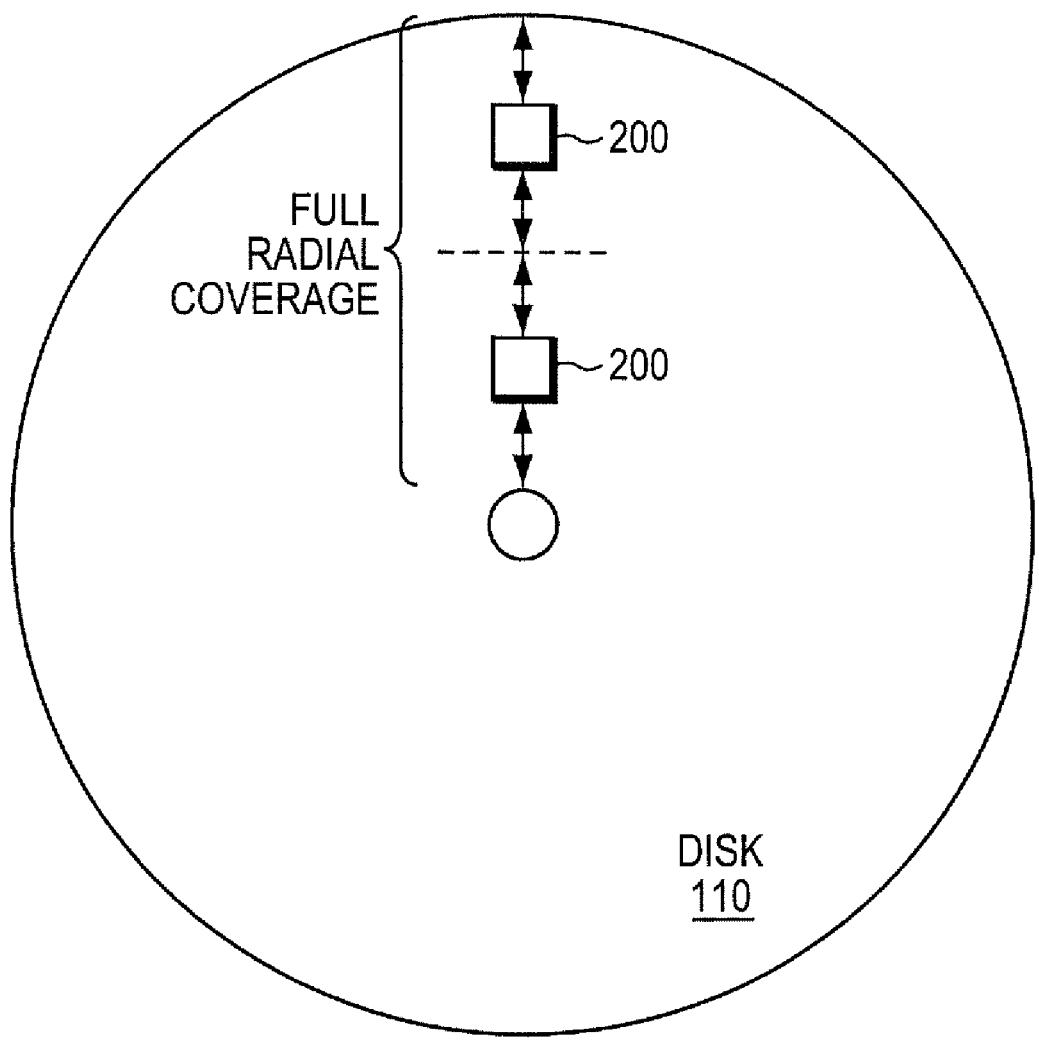
FIG. 6 is a simplified schematic diagram of moving concentrated magnetic force mechanism(s) in accordance with the present invention.

Alternatively, a smaller mechanism 200 may be used to produce a smaller field 210, in which case the mechanism may be configured to move (e.g., "sweep") across the surface of the disk to provide full coverage, e.g., with one or more revolutions necessary to fully bulk erase the disk. For example, while in many configurations it may be appropriate to utilize larger concentrated magnetic force mechanisms 200 (e.g., larger magnets) for larger disk surfaces, the use of larger mechanisms may create undesired magnetic characteristics, such as larger stray fields, etc. In such situations, a plurality of mechanisms (e.g., magnets) 200 may be employed to allow for full coverage of the disk surface 110. For instance, FIG. 6 is a simplified schematic diagram of moving concentrated magnetic force mechanism(s) 200 in accordance with the present invention. The concentrated magnetic force mechanism 200 may be configured to remain stationary (i.e., where a plurality of magnets provides full coverage of the disk surface 110), or, illustratively, to move (e.g., "sweep") across the surface of the disk to provide full coverage as mentioned above. Those skilled in the art will understand that while the plurality of concentrated magnetic force mechanisms (magnets) 200 have been shown adjacent one another, their locations may be in close proximity (e.g., both fitting through an aperture 160), or further apart, such as for coverless (or internal) implementations. Also, in implementations designed to fit through an opening 160, the sweeping directions may conform to the shape of the opening (e.g., curved), rather than straight, as shown.

By utilizing the concentrated magnetic force mechanism(s) 200 in a manner described herein, the present invention efficiently bulk erases a disk drive 100 (e.g., at least one disk surface 110). In particular, the apparatus and method described herein efficiently bulk erase disks without presenting harmful conditions to magnetically sensitive components of the disk drive 100 from stray fields 220. Also, the concentrated magnetic force mechanism(s) 200 in the embodiments described above may be designed and sized to create a focused magnetic field 210 large enough to erase more than one track at a time, as will be understood by those skilled in the art.

Figure 7:
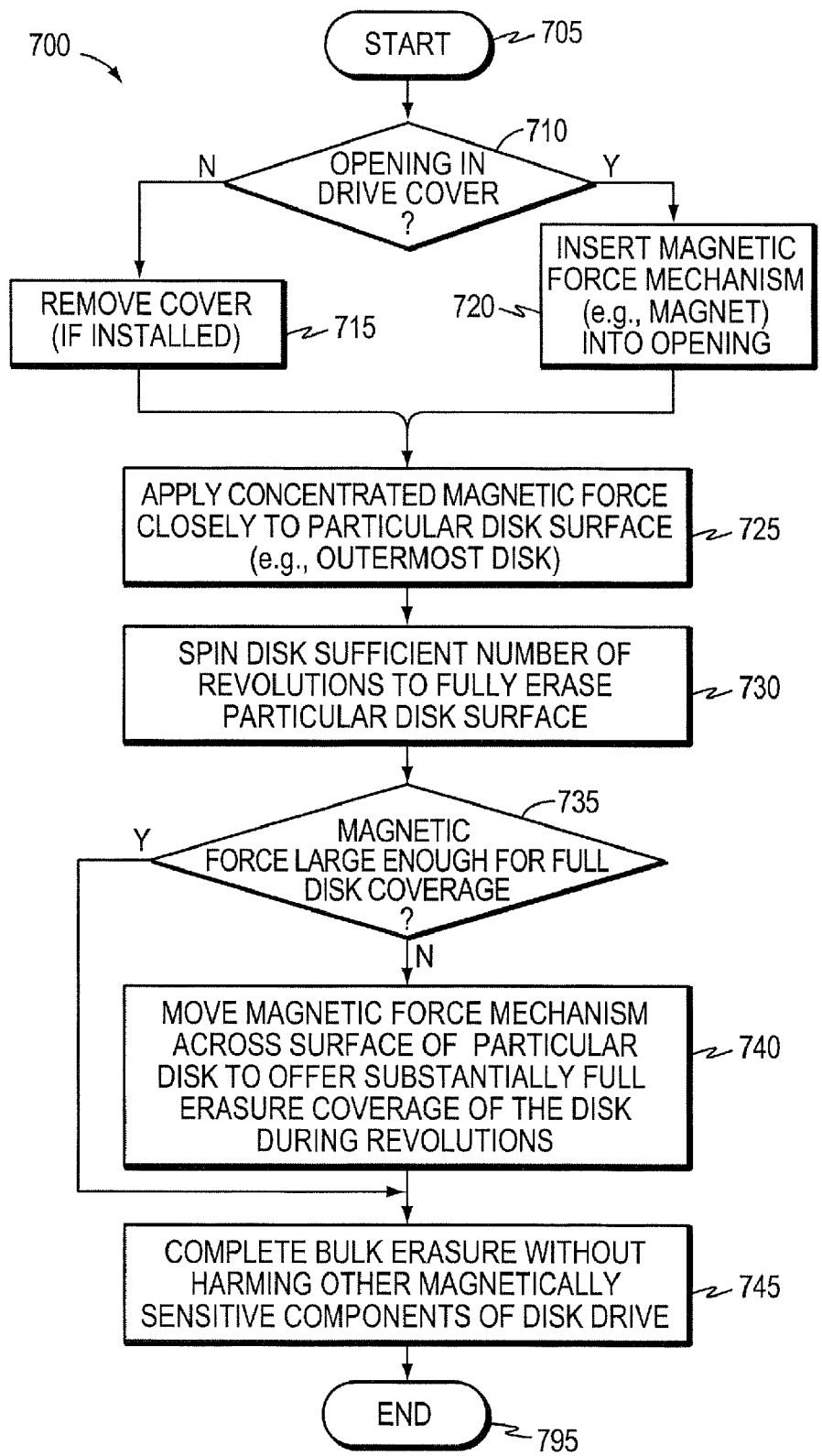
FIG. 7 is a flowchart illustrating a procedure for bulk erasing disk drives in accordance with the present invention.

Briefly, FIG. 7 is a flowchart illustrating a procedure for bulk erasing disk drives in accordance with the present invention. The procedure 700 starts at step 705, and continues to step 710, where the disk drive 100 either has an opening 160 in the cover 150 or does not. If not, the cover 150 is removed in step 715. If there is an opening 160 in the cover 150, however, a magnetic force mechanism 200, such as a magnet (e.g., a permanent magnet or electromagnet), is inserted into the opening in step 720. In step 720, the mechanism (magnet) 200 produces a concentrated magnetic force 210 that is closely applied to the particular disk surface 110 (e.g., of the outermost disk), such as to a particular distance, described above. The disk is then spun in step 730 a sufficient number of revolutions to fully erase the particular disk surface. (Notably, as described above, the disk may already be spinning as the magnet and resultant force/field is closely applied.) If the magnetic force mechanism (magnet) 200 does not produce a magnetic force 210 large enough to provide full disk coverage in step 735, then the mechanism (or mechanisms, as described above) may be moved across the surface of the particular disk surface 110 in step 740 to offer substantially full erasure coverage of the disk during revolutions. In step 745, the substantial bulk erasure of the disk is completed, and is done so without harming other magnetically sensitive components (e.g., motor magnets 120 and/or 130) of the disk drive 100 from stray fields 220, as described in detail above. The procedure 700 ends in step 795

Advantageously, the novel invention bulk erases disk drives bringing concentrated magnetic force mechanisms (and resultant focused magnetic fields) close to the disk surface to be erased. The magnets of the novel invention limit stray magnetic fields, thus preventing potentially harmful effects on other components of the disk drives. Also, the present invention may be used with both AC- and DC-demagnetization, and is thus applicable to both perpendicular and longitudinal magnetic recording disk drives. Further, the present invention is efficient and relatively simple to implement, conserving time, space, and expenses.

While there has been shown and described an illustrative embodiment that bulk erases disk drives, it is to be understood that various other adaptations and modifications may be made within the spirit and scope of the present invention. For example, the invention has been shown and described herein for use with a spinning disk. However, the invention in its broader sense is not so limited, and may, in fact, be used with a stationary disk, over which the concentrated magnetic force is moved for coverage of the entire disk surface (e.g., for embodiments without a cover), as will be understood by those skilled in the art. Also, while the invention has been shown using various distances, forces, tolerances, etc., other values may be used in accordance the present invention where applicable, and such values are used herein merely as examples, e.g., for use with conventional disk drives available at the time of filing. Further, the invention has been primarily shown for use with bulk erasing a single disk surface. However, the present invention may also be utilized to erase multiple disk surfaces, e.g., simultaneously.

The foregoing description has been directed to specific embodiments of this invention. It will be apparent, however, that other variations and modifications may be made to the described embodiments, with the attainment of some or all of their advantages. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system for bulk erasure of a surface of a disk drive, comprising:
    a disk drive including a disk surface of the disk drive and a cover with an aperture in the cover, the aperture having a first area; and
    a concentrated magnetic force mechanism having a second area and configured to emit a focused magnetic field sufficient to erase the disk surface, wherein the second area of the concentrated magnetic force mechanism is smaller than the first area of the aperture in the cover of the disk drive so that at least a portion of the concentrated magnetic force mechanism is positioned within the aperture and configured to apply the focused magnetic field to the disk surface.

2. The system as in claim 1, wherein the disk drive comprises a plurality of disks, and wherein further the focused magnetic field is adapted to substantially erase only an outermost disk of the plurality of disks.

3. The system as in claim 1, wherein the focused magnetic field is not less than 4 kilo Gauss (kG).

4. The system as in claim 1, wherein any stray magnetic fields are not greater than 3 kilo Gauss (kG).

5. The system as in claim 1, wherein the concentrated magnetic force mechanism is adapted to apply the focused magnetic field within 0.5 millimeters (mm) of the disk surface.

6. The system as in claim 1, wherein an actuator or a servo track writer is also positioned within the aperture.

7. The system as in claim 1, wherein:
    the concentrated magnetic force mechanism comprises a permanent magnet.

8. The system as in claim 1, wherein:
    the concentrated magnetic force mechanism comprises an electromagnet.

9. The system as in claim 8, wherein the concentrated magnetic force mechanism is adapted to produce an alternating current (AC) magnetic force.

10. The system as in claim 1, wherein: the concentrated magnetic force mechanism comprises a plurality of magnets.

11. The system as in claim 1, wherein the concentrated magnetic force mechanism is further adapted to move the focused magnetic field across the disk surface to provide substantially full erasure coverage of the disk surface.

12. The system as in claim 1, wherein the disk surface is one of either a perpendicular recording medium or a longitudinal recording medium.

13. The system as in claim 1, wherein the concentrated magnetic force mechanism is configured to emit stray magnetic fields that are substantially harmless to sensitive components of the disk drive.

14. The system as in claim 1, wherein the concentrated magnetic force mechanism comprises a first magnetic pole and a second opposing magnetic pole adjacent and parallel to the first magnetic pole, and wherein the first and second magnetic poles are configured to emit the focused magnetic field and wherein the first and second magnetic poles are positioned within the aperture to apply the focused magnetic field to the disk surface.

15. The system as in claim 14, wherein the first and second magnetic poles are shaped to substantially conform to the aperture.

16. The system as in claim 14, wherein the first and second magnetic poles are curved in shape.

17. The system as in claim 14, wherein an actuator or a servo track writer is also positioned within the aperture.

18. The system as in claim 14, wherein the first and second poles further comprise:
    one of either a permanent magnet or an electromagnet.

19. The system as in claim 14, further comprising:
    a ferromagnetic material disposed on the first and second poles providing a return path for magnetic flux of the focused magnetic field.

20. The system as in claim 14, wherein the first and second poles are separated by a gap.

21. A method for bulk erasure of magnetic media on a disk surface of a disk drive, the method comprising:
    providing the disk drive with a cover that protects the disk drive, the cover having an aperture with a first area;
    positioning a concentrated magnetic force mechanism within the aperture with a portion having a second area smaller than the aperture first area;
    using the concentrated magnetic force mechanism, applying a focused magnetic field to the disk surface; and
    spinning the particular disk surface a sufficient number of revolutions to substantially erase the disk surface with the applied focused magnetic field.

22. The method as in claim 21, wherein the disk drive comprises a plurality of disks, and further comprising:
    substantially erasing only an outermost disk of the plurality of disks.

23. The method as in claim 21, further comprising:
    configuring the concentrated magnetic force mechanism to produce a focused magnetic field sufficient to erase the disk surface.

24. The method as in claim 23, wherein the focused magnetic field is not less than 4 kilo Gauss (kG).

25. The method as in claim 21, wherein the stray magnetic fields are not greater than 3 kilo Gauss (kG).

26. The method as in claim 21, further comprising:
applying the focused magnetic field within 0.5 millimeters (mm) of the disk surface.

27. The method as in claim 21, wherein an actuator or a servo track writer is also positioned within the aperture.

28. The method as in claim 21, wherein:
the concentrated magnetic force mechanism comprises a permanent magnet.

29. The method as in claim 21, further comprising:
applying an electrical voltage to an electromagnet in the concentrated magnetic force mechanism.

30. The method as in claim 29, further comprising:
producing an alternating current (AC) magnetic force by the concentrated magnetic force mechanism.

31. The method as in claim 21, wherein:
the concentrated magnetic force mechanism comprises a plurality of magnets.

32. The method as in claim 21, wherein:
the concentrated magnetic force mechanism is a component within the disk drive.

33. The method as in claim 21, further comprising:
moving the concentrated magnetic force mechanism across the disk surface during rotation to provide substantially full erasure coverage of the particular disk surface with the applied focused magnetic field.

34. The method as in claim 21, wherein the sufficient number of revolutions is one revolution.

35. The method as in claim 21, wherein the disk surface is one of either a perpendicular recording medium or a longitudinal recording medium.

36. The method as in claim 21, further comprising avoiding damaging sensitive components of the disk drive with the concentrated magnetic force mechanism.

37. A system for bulk erasure of a surface of a disk drive comprising:
a disk drive with a disk surface and a cover with an aperture having a first area; and
an electromagnetic concentrated magnetic force mechanism adjacent to the disk surface comprising a first magnetic pole and a second opposing magnetic pole adjacent and parallel to the first magnetic pole, the electromagnetic concentrated magnetic force mechanism positioned within the cover aperture.

38. The system of claim 37, wherein the electromagnetic concentrated magnetic force mechanism is contained within the cover of the disk drive.

* * * * *